Patented June 10, 1924.

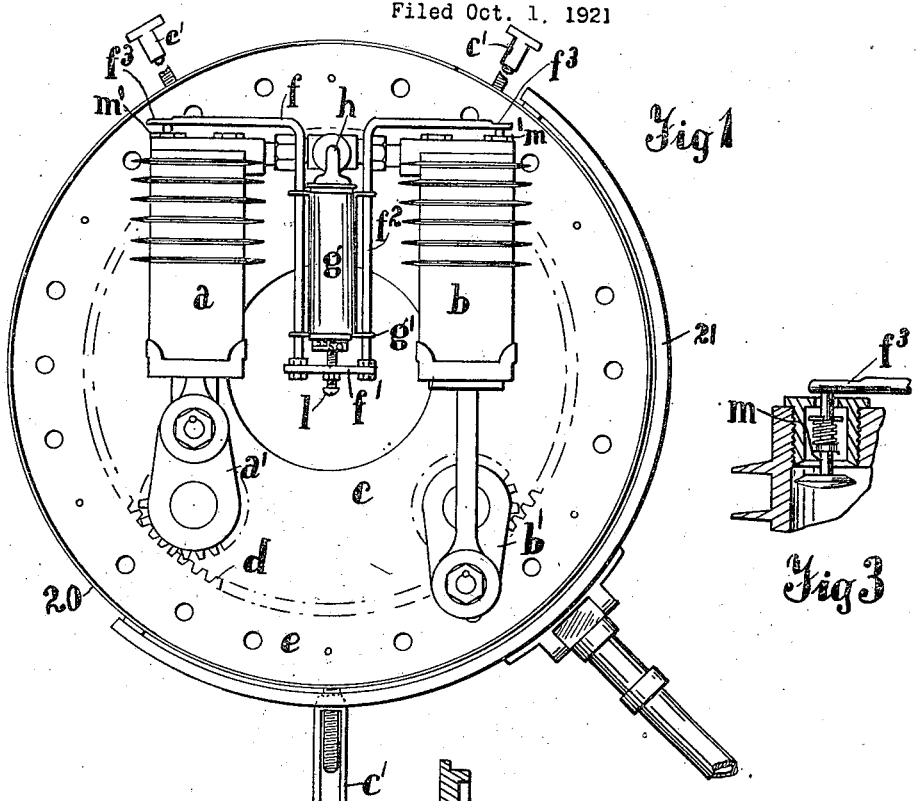

1,497,057

UNITED STATES PATENT OFFICE.

ROBERT BARNFATHER, OF FULHAM, LONDON, ENGLAND.

TIRE-INFLATING APPARATUS.

Application filed October 1, 1921. Serial No. 504,754.

*To all whom it may concern:*

Be it known that I, ROBERT BARNFATHER, a subject of the King of England, residing at 2 Aspenlea Road, Fulham, London, W. 6, England, have invented certain new and useful Improvements in Tire-Inflating Apparatus, of which the following is a specification.

This invention relates to tire-inflating apparatus for road vehicles, of the kind in which the inflating mechanism is operated by the revolution of the road wheel to which the apparatus is fitted, so that in the case of a leakage or puncture the air pressure can be maintained within the pneumatic tire during running. Tire inflators of this type are described in my prior Letters Patent Nos. 972,050, 1,105,057 and 1,108,827.

The present invention has for object to provide means for reducing the power consumed in the running of the apparatus when once the required pressure is restored in the tire, and thereby decreasing the wear upon the moving parts as well as the heating of the same. A further object is to neutralize the pumping action of the inflator and allow the pump to run idly as soon as the pressure attains the desired degree. The invention has also for object to facilitate the adjustment of the pressure at which the pumping action is neutralized, so that this pressure may be regulated according to the actual loading of the vehicle and other circumstances.

According to the present invention, I provide an automatic unloading device for a tire-inflating apparatus of the kind described, in which the pressure of the air displaces a spring-controlled member, the increasing movement of which operates mechanically to neutralize the pumping action of the cylinders as soon as the desired pressure is attained; that is to say, the control member begins to move towards its striking or actuating position as soon as the pump comes into action and when its movement has reached the predetermined extent, it operates to neutralize the pumping action. This automatic unloading device may consist of a control cylinder, the piston or plunger of which is moved against a spring in proportion to the rise of pressure, the movement of the said piston or plunger being transmitted through an adjustable tappet or the like to operate the pump unloading mechanism. Preferably the pump cylinders are placed out of action by the unloading mechanism holding their suction or inlet valves in the open position.

Upon the accompanying drawings,

Figure 1 is a front elevation of a tire inflating apparatus of the kind referred to, but fitted with the present automatic unloading device.

Figure 2 is a sectional elevation through the control cylinder at right angles to Figure 1.

Figure 3 is a detail view showing an inlet valve being held open by one arm of the frame of the mechanical unloading device.

Figure 4 is a detail view of the spring for returning the unloading device.

The two cylinders $a$ $b$ are mounted side by side upon the base plate $c$ and have their pump pistons driven in the known manner by cranks $a'$ $b'$ operated through gearing $d$ from the outer ring or drum $e$. Means for holding the outer ring $e$ stationary when required are also provided such as a band brake 20 anchored by a fork 21 extending to a point upon the vehicle, as in my patent specification 1,105,057; the brake 20 may be applied when required to this ring $e$ to effect rotation of the cranks and gearing $d$, so as to operate the pumps whilst holding the ring $e$ from revolving.

A sliding frame $f$ of U-shape is supported upon the device, the parallel legs $f^2$ of the frame being guided in any suitable manner as at $g'$ to move parallel to the axes of the cylinders $a$ $b$. This frame is adapted to effect in a mechanical manner the unloading of the cylinders $a$ $b$, for example as indicated in Figure 3 by holding open the inlet valves $m$ of the pump cylinders.

In a convenient position for example between two pump cylinders and parallel thereto, is mounted a control cylinder $g$ to which the compressed air is admitted at one end through a small pipe $h$ extending from the T or union $i$ conveying the air from the cylinder delivery to the usual flexible tube connection $j$ leading to the valve of the pneumatic tire. The cylinder $g$ is shown fitted with external lugs $g'$ to act as guides for the parallel legs $f^2$ of the frame $f$.

The piston $k$ of this control cylinder $g$ is acted upon by one or more springs $k'$, so that its movement is regulated in proportion to the air pressure, the piston being subjected to air-pressure from the pumping cylinders through the passage $h$. The piston $k$ is arranged to engage, by means of an adjustable screw, tappet rod or the like $l$, the centre of the cross-bar $f'$ of the U-shaped frame $f$, the tappet or screw $l$ being so adjusted that when the air-pressure reaches the desired intensity, the gradual outward movement of the piston $k$ has become sufficient to engage this tappet and thereby to slide the frame $f$ longitudinally; thereupon the lateral extremital arms $f^3$ of the U-frame press both inlet valves $m$ of the pump cylinders $a$ $b$ from their seatings. The pump cylinders $a$ $b$ are thus put out of action, enabling the mechanism to run freely with a minimum of power waste or heating, so long as the pressure is maintained, but if the pressure falls to a sufficient extent the movement of the piston $k$ will allow the frame $f$ to return under the action of centrifugal force or suitable recall springs, and the pump cylinders will resume operation, because the inlet valves will be no longer engaged by the arms $f^3$ of the frame $f$.

The control cylinder $g$ may take the form of the known type of pressure-gauge for pneumatic tires, in which a plunger piston projects from the open end of a cylinder so as to show by calibrations upon its surface the pressure within the gauge. In the drawings I have shown the figures 50 and 55 upon the projecting part of the piston $k$ to indicate pressure in pounds to the square inch. Any other suitable spring-fitted plunger adapted to project under differential pressure may be employed.

It is to be noted that the plunger or piston $k$ moves gradually outwards until in its ever-increasing movement it operates upon the tappet $l$ and cross-bar $f'$ to neutralize by mechanical means the pumping action of the cylinders $a$ $b$.

Suitable springs $n$ may be arranged in combination with the guides as shown in Figure 4, to maintain the frame $f$ against the piston $k$, with its extremities normally clear of the valve stems to permit working of the pumps.

If desired, the automatic safety valve described in my prior patent specification No. 1,105,057 for allowing escape of air may be retained, and the brake band 20 may also be adjusted to slip under excessive torque, thus providing an additional safe-guard against over-inflation and also a yielding thrust-connection to absorb shocks or the like.

The above described apparatus may be easily and expeditiously attached to the road wheel in any convenient manner, for example, by passing the hub cap of the road wheel through the central opening of the base plate $c$ and supporting the base plate on a suitable frame attached to the rim or felly of the road wheel by direct connection between the frame and the rim or felly by three or more radially arranged arms, such as clearly shown and described in my prior Patent No. 1,108,827 of August 5, 1914.

Having thus described my invention, what I claim is:—

1. An automatic unloading device for fluid pressure pumping systems, having a pair of pumping cylinders mounted in parallel relation, comprising a control cylinder mounted between said pumping cylinders and parallel thereto, a union connecting the delivery ends of said pumping cylinders, a branch of said union being connected to said control cylinder, a pressure-actuated piston within said control cylinder, a U-shaped frame having its cross-bar engageable by said piston, its sides guided for sliding movement parallel to the axes of said cylinders, and its extremities adapted to engage the inlet valves of said pumping cylinders, and means for holding said frame with its cross-bar towards said piston and its extremities clear of said inlet valves, said holding means being overcome by the movement of said piston when a predetermined pressure is attained.

2. An automatic unloading device for air-pumping systems having a pair of pumping cylinders mounted in parallel relation upon a rotary base and adapted to deliver compressed air alternately, comprising a control cylinder mounted between said pumping cylinders and parallel thereto, a union connecting the delivery ends of said pumping cylinders to the point of utilization, a branch of said union being connected to said control cylinder, a pressure-actuated piston within said control cylinder, a U-shaped frame having its cross-bar engageable by said piston, guides mounted upon the exterior surface of said control cylinder, the side members of said frame movable through said guides parallel to the axes of said cylinders, the extremities of said frame being cranked outwardly in opposite directions and adapted to engage the inlet valve stems of said pumping cylinders, and means for holding said frame with its cross-bar towards said piston and its extremities clear of said inlet valves, said holding means being overcome by the movement of said piston when a predetermined pressure is attained.

3. An automatic unloading device for fluid pressure pumping systems, having a pair of pumping cylinders mounted in parallel relation, comprising a control cylinder mounted between said pumping cylinders and parallel thereto, a union connecting the delivery ends of said pumping cylinders, said control cylinder secured to said union and not otherwise supported, said union communicating fluid pressure to said control cylinder, a pressure-actuated piston within said control cylinder, a U-shaped frame having its cross-bar adjustably engageable by said piston, and guides mounted upon the exterior surface of said control cylinder, the side members of said frame movable through said guides parallel to the axes of said cylinders, the extremities of said frame being cranked outwardly in opposite directions and adapted to engage the inlet valve stems of said pumping cylinders.

4. The combination with an air compressor having pumping cylinders mounted upon a rotating base, of an automatic unloading device comprising a control cylinder in communication with the fluid under pressure, a pressure-actuated piston within said control cylinder and a U-shaped frame having its cross-bar engageable by said piston and its lateral extremital arms adapted to engage the control means of the respective pumping cylinders and stop the pumping action of said cylinders when a predetermined pressure is attained, said frame having its center of gravity located eccentrically of the axis of rotation so as to be withdrawn from engagement with said control means by centrifugal force as soon as the pressure falls to a predetermined value.

In testimony whereof I hereunto affix my signature.

ROBERT BARNFATHER.

Witnesses:
R. BARNFATHER, Jr.,
CYRIL J. FEENY.